Aug. 23, 1960  R. ERICKSON  2,950,122
STABILIZING MECHANISM FOR AUTOMOTIVE VEHICLE
Filed Oct. 30, 1958

INVENTOR.
Roy Erickson
BY
Ooms, McDougall, Williams & Hersh
Attorneys

2,950,122

Patented Aug. 23, 1960

2,950,122

STABILIZING MECHANISM FOR AUTOMOTIVE VEHICLE

Roy Erickson, Box 155, Thiensville, Wis.

Filed Oct. 30, 1958, Ser. No. 770,672

5 Claims. (Cl. 280—104)

This invention relates to a device for stabilizing the body and frame of an automotive vehicle.

The suspension system of modern automotive vehicles, and particularly passenger automobiles, is designed to provide a softer and more comfortable ride for the passengers, but the resilience introduced by the suspension system between the automobile body and the wheels which is necessary for the comfort of the riders has had an adverse effect on the braking system of the car and on its stability when the brakes are suddenly applied or when the vehicle suddenly encounters an irregularity in the road, particularly while moving at high speeds. When brakes are suddenly applied, the well-known front end dip or dive occurs which is accompanied by a corresponding rise in the rear end of the body of the vehicle. This sharply reduces the traction between the rear wheels and the road. The same effect can also occur when the vehicle encounters an irregularity in the road, whether the brakes are applied or not. The reason for this is that the weight of the motor is concentrated at the front end of the vehicle so that when the moving vehicle encounters a shock producing irregularity, the weight of the motor produces a substantial deflection in the front car springs.

If this front end dip and rear end rise of the vehicle body and frame which now occurs when the car brakes are suddenly applied or when the vehicle suddenly encounters an irregularity in the road could be eliminated, the traction between the ground and the rear wheels would increase. In addition, if the front end of the vehicle could be made to rise instead of dip, the upward inclination of the body would make it easier for the driver to maintain his position so that driver control would increase during emergency braking conditions.

Mechanisms such as that described in my copending application Serial No. 770,671 filed concurrently herewith and entitled "Anti-Dive Means in Automotive Vehicle" have been devised for preventing front end dipping caused by a sudden application of the vehicle brakes while the vehicle is moving. The mechanism described in the above-mentioned application does this by causing a force to be exerted between the rear body frame and the rear axle housing which draws the rear portion of the body down toward the axle housing. But this mechanism only works when the brakes are applied, and it is desirable to provide a mechanism which automatically prevents dipping or diving which occurs because of the condition of the road, and this comprises the principal object of this invention.

These and other objects of this invention will become more apparent when read in the light of the accompanying drawings and specification, wherein.

Figure 1:
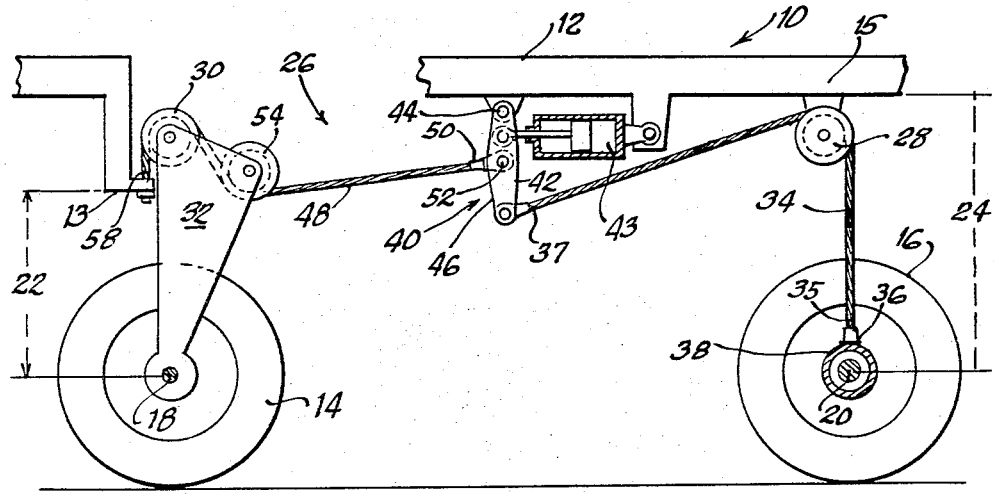
Figure 1 is a diagrammatic side view of an automotive vehicle showing the stabilizing mechanism in a rest position.

Referring now to Figure 1 of the drawing, an automotive vehicle indicated generally by the reference numeral 10 comprises a body frame 12 and front and rear wheels 14 and 16 which are connected to the body frame by means of a conventional suspension system (not shown). The automotive vehicle is provided with all the other usual parts such as the motor, body, brakes, etc. which are not shown in the drawing because they are not essential for an understanding of this invention. The front and rear wheels rotate on rotational axes 18 and 20, and because the suspension system produces a resilient connection between the body frame 12 and the front and rear wheels 14 and 16, the spacing 22 indicated by the dotted line between the rotational axes 18 of the front wheels 14 and the front portion 13 of the body frame 12 above the rotational axes, and the distance indicated by the dotted line 24 between the rotational axis 20 of the rear wheels and the portion 15 of the body frame directly above it, will continually vary as the vehicle moves. In particular, when the brakes are applied to a conventional vehicle, or when the vehicle suddenly encounters an irregularity in the road, the front portion 13 of the body frame 12, assisted by the weight of the motor, will dip, decreasing spacing 22, while the rear portion of the body frame 12 rises, increasing distance 24.

To prevent this front end dip and rear end rise, an automatic stabilizing mechanism, indicated generally by the reference numeral 26, is provided. As seen, the stabilizing mechanism comprises a system of cables and pulley wheels or other cable guiding means. At least one pulley wheel 28 is secured to the rear portion 15 of the body frame 12 above the rotational axis 20 of the rear wheels, and at least one pulley wheel 30 is mounted on a support 32 which is connected to the front wheel 14 so the pulley wheel 30 is in fixed relation to the rotational axis 18 of the front wheel 14. Support 32 may be a separate post secured by any conventional means to one or both of the front wheels, or if the design of the front end of the particular vehicle warrants it, the support may be the top of one or both of the shock absorbers of the vehicle suspension system.

One rear cable 34 of the cable system is connected at one end 35 by any conventional means to some point 36 on the vehicle in fixed relation to the rotational axis 20 of the rear wheels, i.e., the rear axle housing 38. The remaining portion of the cable 34 passes over pulley wheel 28 which is in vertically spaced relation to the rear axle housing 38. The opposite end 37 of cable 34 is connected to a movement multiplying mechanism indicated generally by the reference numeral 40. This mechanism, in this particular embodiment, happens to be a lever 42, but it is to be understood that other mechanisms, such as an appropriate gear system, may be used and are contemplated, and the claims are to be construed accordingly.

Lever 42 is pivotally connected at end 44 to the body frame 12 at a point intermediate its ends, and the end 37 of rear cable 34 is secured to the free end 46 of lever 42. A front cable 48 is secured at end 50 to lever 42 at some point 52 intermediate its ends. The remaining portion of cable 48 passes under the guide pulley 54 and over pulley 30 on support 32. The opposite end 58 of cable 48 is secured to the front portion 13 of frame 12 in vertically spaced relation below pulley 30.

Figure 2:
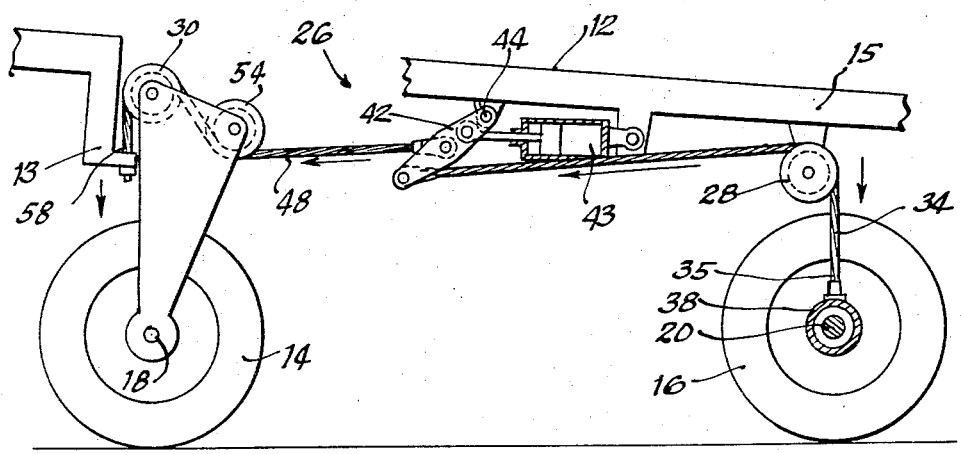
Figure 2 is a diagrammatic side view of an automotive vehicle showing the stabilizing mechanism in operative position.

With this arrangement it is apparent, as seen in Figure 2, that a decrease in spacing 22 caused when the front portion 13 of the body 12 dips toward the rotational axis 18 of the front wheels 14, as indicated by the vertical arrow, and which would ordinarily be accompanied by an increase in distance 24, now causes a displacement in front cable 48 in the direction indicated by the horizontal arrows. The force exerted by the displaced cable 48 on lever 42, assisted by the weight of the motor, rotates the lever in the clockwise direction and this rotation produces a displacement in cable 34 in the direction indicated by the appropriate substantially horizontal arrow. Since end 35 of the cable 34 is secured to the rear axle housing 38, and since the rear wheels 16 must always remain on the ground. The force exerted by cable 34 on the rear axle housing as it passes over pulley 28 causes the cable 34 to pull the rear portion 15 of the body frame 12 down toward the rotational axis 20 of the rear wheels. Since the connection of the rear cable 34 to lever 42 is at its free end and is at a greater distance from the pivotal axis of the lever than the connection of the front cable 48, the displacement of cable 34 will be greater than the displacement of cable 48, so distance 24 will decrease faster than the decrease in spacing 22. This causes the body frame to incline upwardly, which is most desirable from the point of view of rear wheel traction and driver control. In practice, it has been found desirable to adjust the connections of the front and rear cables 34 and 48 to lever 42 so that one inch of front end dip will pull the rear end 15 of the body frame 12 down two inches.

After the brakes are released, or after the irregularity in the road which causes the dip is passed, the suspension system of the vehicle would return the body frame to its normal position. If this happened too rapidly, driver control would be affected adversely. To prevent this, a shock absorber 43 is secured to the body frame 12 and to lever 42, so that the speed of the suspension system in returning the body frame 12 to its normal position can be controlled.

Only one front cable and one rear cable are shown in the drawing, and if the stabilizing system used this arrangement, the pulley wheels 28 and 30 would have to be disposed on the center line of the vehicle. A more stable and more satisfying arrangement would be to have two front and two rear cables in spaced parallel relationship at the sides of the vehicle with a lever system for each side. Alternatively, it is contemplated that only one rear cable be provided at the rear of the body frame 12 which would be beneath the center line of the body, and there would be two front cables connected to the pulley wheels 30 above each front wheel which would also be connected to the common lever 42. The opposite arrangement is also possible and the claims should be so construed.

Figure 3:
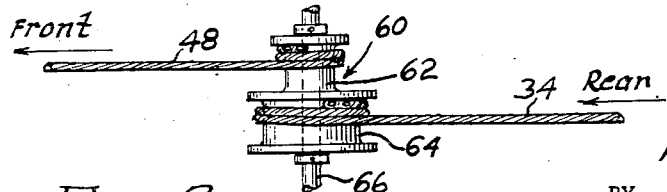
Figure 3 is a top plan view of a modification of the stabilizing mechanism.

Instead of the lever arrangement described, use can be made of a pulley system, illustrated in Figure 3. The pulley 60, formed with one sheave 62 of smaller diameter and another sheave 64 of larger diameter is mounted for free rotational movement together on a shaft 66 which is stationarily supported from the body frame 12 of the vehicle somewhat in the same location as the lever 42. The cable 48 is wound about the sheave 62 of smaller diameter and the cable 34 is wound about the sheave 64 of larger diameter so that release of cable 48 in response to a dip in the front of the vehicle will result in take-up of cable 34 to cause the previously described greater dip to take place at the rear of the vehicle.

It is apparent that when the brakes are applied to an automotive vehicle with the stabilizing system described above, or if the vehicle should suddenly encounter an irregularity in the road, any dip in the front end which would normally result in a loss of rear wheel traction and a decrease in driver control will be automatically corrected.

The invention may be embodied in other forms without departing from the spirit or essential characteristics thereof as set forth in the claims, and the present embodiment is therefore to be considered as illustrative and not restrictive and it is intended to include all changes which come within the scope and range of the claims.

I claim:

1. In an automotive vehicle having a body frame, a suspension system, and front and rear wheels, the improvement comprising a force exerting means connected to a point on the vehicle in a fixed relation to the rotational axis of the rear wheels and coupled to the adjacent rear portion of the body frame for drawing the rear portion of the body frame closer to said point to an extent increasing with the magnitude of the force exerted, a cable system and cable guides, at least one cable guide rigidly mounted on a support in fixed relation to the rotational axis of the front wheels, one end of the cable system secured to said force exerting means for actuation thereof, said cable system passing over the support-mounted cable guide and terminating in a connection with the front portion of the body frame at a point below the support-mounted cable guide so that a decrease in the spacing between the front portion of the body frame and the rotational axis of the front wheels produces a force in the cable system which actuates said force-exerting means so the force exerted between the rear portion of the body frame and the rotational axis of the rear wheels will increase as said spacing decreases.

2. In an automotive vehicle having a body frame, a suspension system, and front and rear wheels, the improvement comprising a cable system and cable guides, at least one cable guide secured to the rear of the body frame above the rotational axis of the rear wheels, at least one cable guide rigidly mounted on a support in fixed relation to the rotational axis of the front wheels, one end of the cable system secured to a point on the vehicle in fixed relation to the rotational axis of the rear wheels, said cable system passing over said cable guide above the rotational axis of the rear wheels and over the support-mounted cable guide and terminating in a connection with the front portion of the body frame at a point below the support-mounted cable guide so that a decrease in the spacing between the front body frame and the rotational axis of the front wheels produces a force in the cable system which pulls the rear body frame down toward the rotational axis of the rear wheels.

3. In an automotive vehicle having a body frame, a suspension system, and front and rear wheels, the improvement comprising a cable system and cable guides, at least one cable guide secured to the rear of the body frame above the rotational axis of the rear wheels, at least one cable guide mounted on a support in fixed relation above the rotational axis of the front wheels, a movement-multiplying mechanism, at least one rear cable in said cable system secured at one end to a point in fixed relation to the rotational axis of the rear wheels, said rear cable passing over said cable guide above the rotational axis of the rear wheels and secured at its opposite end to one part of said movement-multiplying mechanism, at least one front cable in said cable system secured at one end to another part of said movement-multiplying mechanism and passing over said support-mounted cable guide secured at its opposite end to the front body frame at a point below the support-mounted cable guide so that a decrease in the spacing between the front body frame and the rotational axis of the front wheels causes a displacement in the front cable which causes the movement-multiplying mechanism to produce an amplified displacement in the rear cable thereby causing the rear body frame of the vehicle to move toward the rotational axis of the rear wheels faster than the front body frame moves toward the rotational axis of the front wheels.

4. In an automotive vehicle having a body frame, a suspension system, and front and rear wheels, the improvement comprising a cable system and pulley wheels, at least one pulley wheel secured to the rear of the body frame above the rotational axis of the rear wheels, at least one pulley wheel mounted on a support in fixed relation to the rotational axis of the front wheels, a lever arm pivotally secured to a portion of the body frame at a point intermediate the ends of said body frame, at least one rear cable in said cable system secured at one end to a point on the vehicle in fixed relation to the rotational axis of the rear wheels, said rear cable passing over said pulley wheel above the rotational axis of the rear wheels and secured at its opposite end to a portion of said lever arm remote from the portion pivotally connected to the body frame, at least one front cable in said cable system secured at one end to the lever arm at a point intermediate the pivotal connection of the lever arm with the body frame and the connection of the end of the rear cable with the lever arm, said front cable passing over said support-mounted pulley wheel and secured at its opposite end to the front body frame at a point below the support-mounted pulley wheel so that a decrease in the spacing between the front body frame and the rotational axis of the front wheels causes a displacement in the front cable which pulls the lever arm so it pivots and its free end moves toward the front of the vehicle, said pivoting movement of said lever arm producing an amplified displacement in the rear cable thereby causing the rear body frame of the vehicle to move toward the rotational axis of the rear wheels faster than the front body frame moves toward the rotational axis of the front wheels.

5. The apparatus set forth in claim 4 including a shock absorber connected between the lever arm and an adjacent portion of the body frame to regulate the speed which the body frame can return to its normal position.

References Cited in the file of this patent

UNITED STATES PATENTS

| | | |
|---|---|---|
| 1,075,415 | Guillery | Oct. 14, 1913 |
| 1,703,323 | Sanford | Feb. 26, 1929 |
| 1,953,751 | De Samelson et al. | Apr. 3, 1934 |
| 2,506,395 | Straub | May 2, 1950 |

FOREIGN PATENTS

| | | |
|---|---|---|
| 478,248 | Great Britain | Jan. 14, 1938 |